(12) United States Patent
Santerre et al.

(10) Patent No.: US 6,398,833 B1
(45) Date of Patent: Jun. 4, 2002

(54) AIR/OIL SEPARATOR

(75) Inventors: Richard Santerre, Brossard; Sylvain Brouillet, Saint-Basile-le-Grand, both of (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/705,741

(22) Filed: Nov. 6, 2000

(51) Int. Cl.[7] ............................................... B01D 45/12
(52) U.S. Cl. ............................. 55/409; 55/525; 96/189
(58) Field of Search ........................... 55/400, 401, 406, 55/408, 409, 525; 96/188, 189

(56) References Cited

U.S. PATENT DOCUMENTS

| 4,049,401 A | 9/1977 | Smith |
| 4,422,821 A | 12/1983 | Smith |
| 4,531,358 A | 7/1985 | Smith |
| 4,714,139 A | 12/1987 | Lorenz et al. |
| 4,755,103 A | 7/1988 | Streifinger |
| 5,776,229 A | * 7/1998 | Blanes et al. .................. 55/407 |
| 6,033,450 A | * 3/2000 | Krul et al. ..................... 55/345 |

* cited by examiner

*Primary Examiner*—Robert A. Hopkins
(74) *Attorney, Agent, or Firm*—Bachman & LaPointe, P.C.

(57) ABSTRACT

A centrifugal separator for separating oil suspended in air and especially intended for use with aircraft engines includes a rotatable chamber filled with a relatively rigid porous material and is driven by a hollow shaft. An inlet for the mixture of air and oil is provided in one end wall of the chamber and separate outlets for oil and air are provided in the outer and inner cylindrical walls of the chamber respectively. Oil droplets are formed in the rigid porous material and ejected out through the oil outlet under centrifugal forces while air relatively free from oil exits the air outlet and enters into the inside of the hollow shaft under the pressure difference. A cut-away area is formed in the rigid porous material to facilitate ejection from the separator of the oil droplets formed in the porous material to clear the passages of the porous material and facilitate a continuous movement of the mixture of air and oil mist.

18 Claims, 2 Drawing Sheets

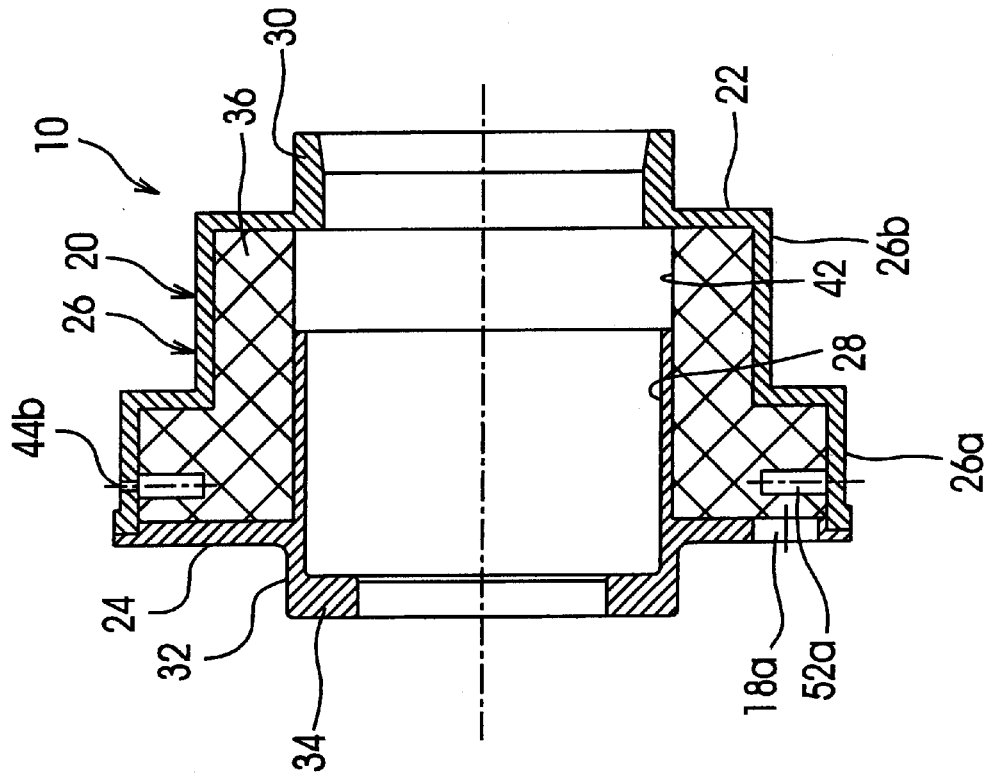
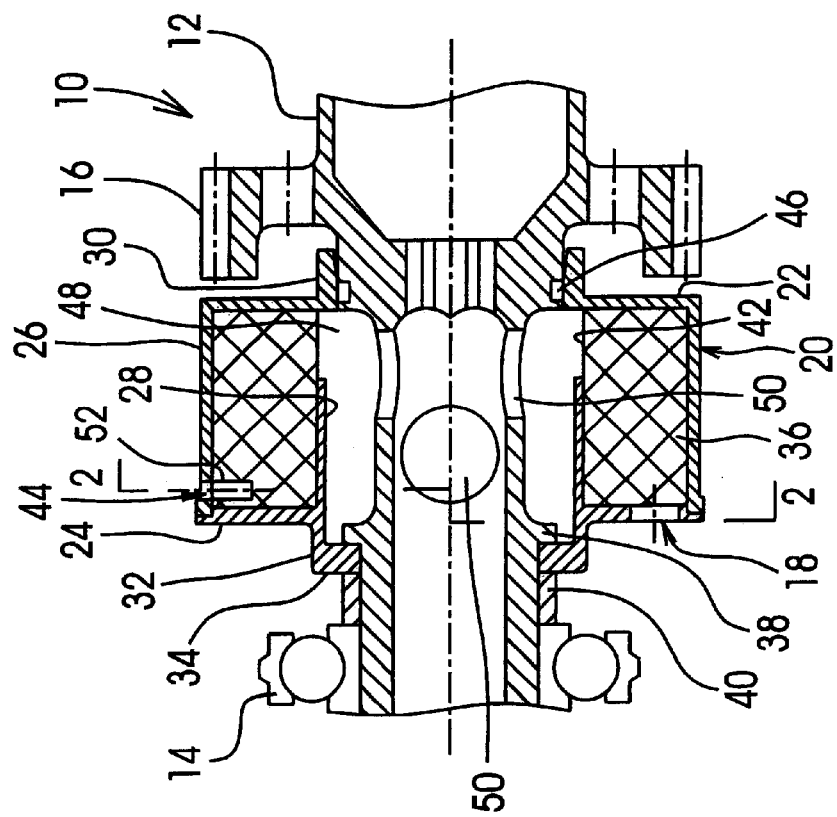
FIG. 4
FIG. 1

AIR/OIL SEPARATOR

FIELD OF THE INVENTION

The present invention relates to an apparatus for separating a liquid in suspension, and more particularly to an apparatus for air/oil separation especially but not exclusively for use in gas turbine engine oil systems.

BACKGROUND OF THE INVENTION

Oil systems, particularly gas turbine engine oil systems require separators for separating air and oil from the mixture produced during operation. These mixtures vary from oil emulsified with air to air contaminated by droplets of oil. For example, the compressed air streams used in gas turbine engines to pressure labyrinth seals for the engine main bearings in order to avoid excessive loss of a lubricating oil, almost invariably become contaminated with oil in the form of droplets suspended in the air. Contamination of the compressed air with oil mist is particularly disadvantageous because, loss of contaminated air from the labyrinth seals in the compressor causes fouling of the engine parts and produces noxious and unpleasant products in air drawn from the compressor for cabin pressurization. A further disadvantage is, of course, the increased loss of the lubricating oil from the engine oil reservoir, necessitating larger capacity reservoirs and adding to the weight of the engine. It has been a particular problem that even relatively small inefficiencies in such separators lead to the loss of a significant quantity of lubricating oil during each hour of operation of the engine.

Centrifugal separators have been extensively used in the aircraft industry in attempts to remove the majority of oil mist from compressed air streams. An example is described in U.S. Pat. No. 4,714,139 issued to Lorenze et al. on Dec. 22, 1987 in which an air/oil separator is used in a gas turbine power plant especially for an aircraft that includes a pump used for the separation of the air and the oil, out of the air/oil mixture. The pump is so constructed that centripetal and centrifugal forces are employed for the air/oil separation. The air passes by centripetal force through a sponge type filter structure and out through a hollow central shaft mounting the pump wheel or forming an integral one-piece component with the pump wheel. The oil does not travel through the filter but is reversed in its travel direction by centrifugal force for return into the lubricant circulating system.

Another example is U.S. Pat. No. 4,755,103 which issued to Streifinger on Jul. 5, 1988. Streifinger describes means for separating an air/oil mixture and for returning oil droplets to a circulation having oil consuming devices, which includes a porous air-permeable element built into the hollow main shaft between two oil impermeable walls whereby outer feed openings for the air/oil mixture are arranged in the upstream wall which correspond to openings in the main shaft while an air discharge opening is arranged through the downstream wall in its center which is in communication with the vent line. The oil is prevented from flowing out of the air discharge opening by centrifugal force and it is thrown back into the bearing chamber and is fed back to the tank by way of the suction line.

The disadvantage of the above prior art lies in that the oil separated from the air/oil mixture travels in a reverse direction relative to the air/oil mixture flow in the sponge type filter or the porous air-permeable element, and exits from the inlet for admitting the air/oil mixture, thereby creating a blockage and increasing the delta pressure across the air/oil separator, resulting in loss of efficiency.

Smith describes, in U.S. Pat. No. 4,049,401 issued on Sep. 20, 1977, a centrifugal separator for separating suspensions of oil mist in air and especially intended for use with aircraft engines. The separator comprises a rotatable chamber filled with a relatively rigid porous material and driven by a hollow shaft. An inlet for the suspension is provided in one end wall of the chamber and separate outlets for oil and air in the form of an apertured chamber outer wall and apertures in the shaft respectively. A buffer is positioned within the chamber between two different grades of porous material to facilitate radial movement of the oil droplets in the porous material. The oil droplets are directed away from the air/oil mixture flow path, thereby reducing the blockage and therefore the delta pressure across the air/oil separator. However, as pointed out by Smith, it has proven possible to dispense with the buffer and the differing grades of porous material without any significant loss of efficiency. In other words, the buffer and differing grades of porous material have not improved the efficiency of the separator.

Therefore, there is a need for an improved air/oil separator for more efficient separation of the air/oil mixture.

SUMMARY OF THE INVENTION

It is one object of the present invention to provide an air/oil separator with a relatively higher efficiency of separation.

It is another object of the present invention to provide an improved form of separator suitable for use in aircraft and lending itself to the construction of a modular and interchangeable separator that is simply constructed and relatively economical to manufacture.

In accordance with the present invention there is provided an apparatus adapted for separating a liquid suspended in a gas, comprising a rotatable vessel defining a chamber and a packing within the chamber adapted to rotate with the vessel. The rotatable vessel has an inlet at a first end of the chamber for admitting the gas having the liquid suspended into the chamber, an outlet for the liquid in the vessel in a radially outer part of the chamber and an outlet for the gas in the vessel in a radially inner part of the chamber at a second end thereof. The packing includes a substantially rigid matrix adapted to inhibit collapse under centrifugal forces during rotation of the vessel, the matrix including interstices defining a plurality of flow passages permeable to the liquid and gas for both axial and radial movement of the liquid and gas therethrough. A cut-away area is formed in the packing to facilitate ejection from the packing of liquid droplets formed in the passages of the packing, whereby the passages are relatively cleared to facilitate a continuous movement of a succeeding portion of the mixture of the liquid and gas therethrough. The cut-away area preferably extends inwardly and radially from an outer periphery of the packing. It is also preferable that the cut-away area is axially located close to the first end of the chamber, and axially aligns with the liquid outlet of the chamber.

In one embodiment of the present invention the cut-away area comprises a plurality of bores circumferentially spaced apart from one another, extending radially from the outer periphery of the packing.

In another embodiment of the present invention the cut-away area comprises an annular groove extending radially from the outer periphery of the packing.

In accordance with another aspect of the present invention, an air/oil separating arrangement is provided for a machine having a rotatable hollow shaft. In the arrangement a vessel defining a separating chamber is mounted to the hollow shaft and adapted to rotate together with the hollow shaft. The vessel has an inlet at a first end of the separating chamber for admitting a mixture of air and oil mist under a pressure differential between outside of the chamber and inside of the hollow shaft, an outlet in a radial inner part of the chamber in communication with the inside of the hollow shaft for exhausting the air into the hollow shaft under the pressure differential, and an outlet in the vessel in a radial outer part of the chamber for expelling oil droplets out of the chamber under centrifugal forces during rotation of the chamber. A packing is filled within the chamber adapted for rotation with the chamber. The packing has a substantially rigid matrix adapted to inhibit collapse under the centrifugal forces. The matrix includes interstices defining a plurality of flow passages permeable to the air and oil mist for both axial and radial movement of the air and oil mist therethrough. A cut-away area formed in the packing radially extending from an outer periphery of the packing to facilitate ejection from the packing of the oil droplets formed in the passages of the packing, whereby the passages are cleared to facilitate a continuous movement of a following portion of the mixture of the air and oil mist.

The cut-away area is preferably located axially close to but spaced apart from an end of the packing adjacent to the inlet. It is also preferable that the oil outlet is axially located close to the first end of the chamber and axially aligns with the cut-away area of the packing while the air outlet is axially located close to a second end of the chamber.

Preferably, the vessel defining the separating chamber is sealingly mounted to the hollow shaft, and an annular space formed between the radially inner part of the chamber and the hollow shaft communicates with the inside of the hollow shaft through at least one aperture through a wall of the hollow shaft so that a pressure at the air outlet of the chamber is maintained lower than the pressure at the inlet and the oil outlet of the chamber.

The air/oil separator according to the present invention advantageously provides an efficient solution with a relatively simple structure for separating oil suspended in air. A major proportion of the oil suspended in the air forms oil droplets in the passages of the packing at a first stage after entering the packing. The major proportion of oil droplets formed in the passages at the first stage will partially block the passages and slow down the continuous movement of a following portion of the mixture in the passages although the oil droplets are eventually ejected away radially by centrifugal forces. The cut-away area formed close to the inlet is used as an early exit from the passages in the packing and a temporary reservoir for the major proportion of the oil droplets so that the oil droplets formed in the passages at the first stage are collected in the cut-away area and quickly ejected from the packing to clear the passages and facilitate a continuous movement of a following portion of the mixture of air and oil.

Other advantages and features of the invention will be better understood with reference to the preferred embodiments described below.

BRIEF DESCRIPTION OF THE DRAWINGS

Having thus generally described the nature of the invention, reference will now be made to the accompanying drawings, showing by way of illustration the preferred embodiments thereof in which:

FIG. 1 is a longitudinally cross-sectional view of an air/oil separator mounted on a hollow shaft according to one preferred embodiment of the invention;

FIG. 4 is a longitudinally cross-sectional view of a air/oil separator according to another preferred embodiment of the invention.

DETAILED DESCRIPTION OF THE PREFERRED EMBODIMENTS

Figure 3:
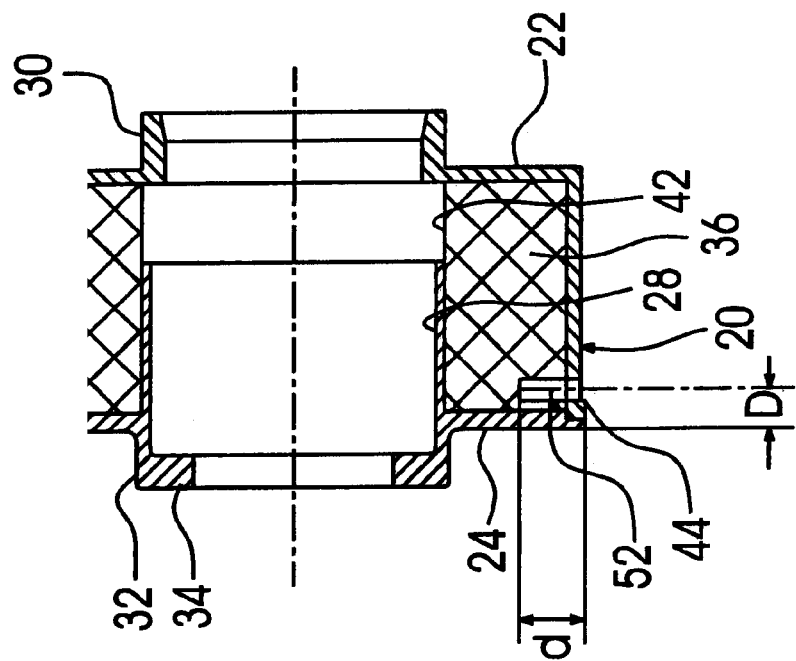
FIG. 3 is a longitudinally cross-sectional view of the air/oil separator taken along line 3—3 and detached from the hollow shaft.
Figure 2:
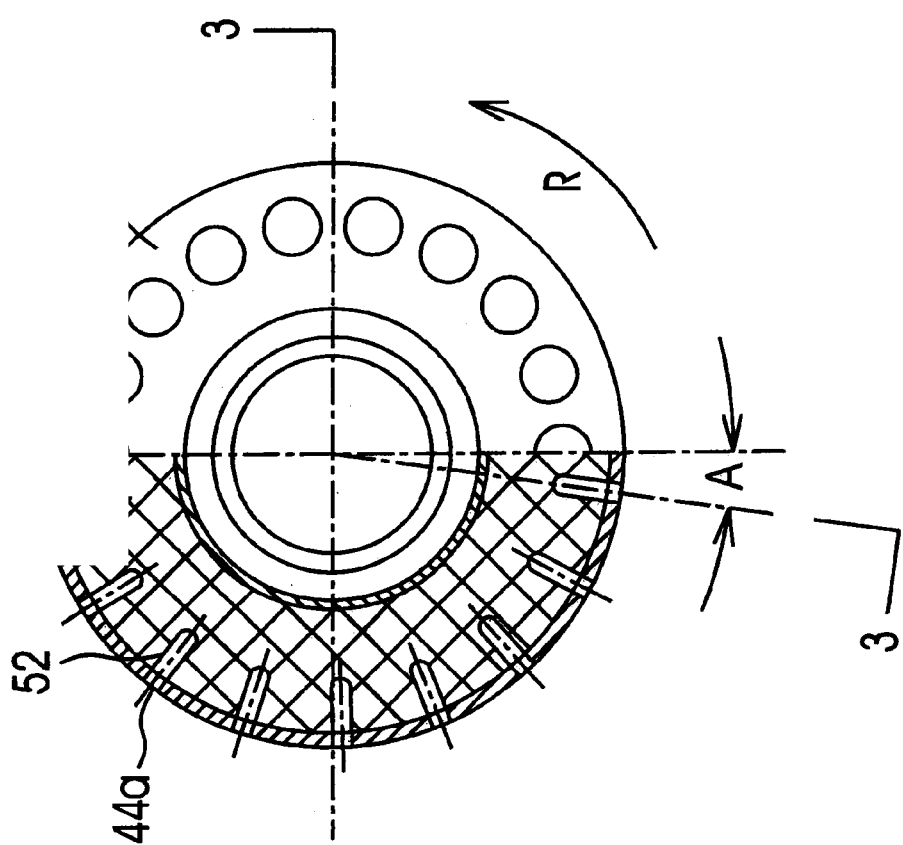
FIG. 2 is a cross-sectional view of the air/oil separator taken along line 2—2 in FIG. 1 and rotated 90° counter-clockwise.

Referring to the drawings, particularly to FIGS. 1 through 3, a rotatable centrifugal separator 10 is mounted on a hollow shaft 12 of a gear box for a jet engine. The hollow shaft 12 is rotatably supported in bearings, only one of which is shown and indicated at numeral 14, and is driven from a main shaft of the engine (not shown) by way of gear 16. A mixture including oil mist suspended in air is passed via the gear box casing (not shown) to the inlet 18 for the separator 10.

The separator 10 includes a rotatable chamber 20 formed by a rear wall 22, a front walls 24, outer cylindrical wall 26 and inner cylindrical 28. The rear wall 22 and the outer cylindrical wall 26 are made as an integral piece while the front wall 24 and the inner cylindrical wall 28 are made as another integral piece. The rear wall 22 includes an annular and axial flange 30, and the front wall 24 includes an annular flange 32 having a radial section 34 so that the assembly of chamber 20 is radially supported on the hollow shaft 12 through the flanges 30 and 32.

Inside the chamber 20 there is provided a packing 36 snugly fit between and frictionally engaging the outer and inner cylindrical walls 26 and 28 so that the assembly of the chamber 20 is secured together. The assembly of chamber 20 is axially restrained on the hollow shaft 12 through the radial section 34 of the flange 32 which is forced to abut an annular shoulder 38 of the hollow shaft 12 by, for example, a nut (not shown) via the bearing 14 and an annular spacer 40. The assembly of chamber 20 is rotatable together with the hollow shaft 12, connected to the hollow shaft 12 by any well known means, such as a key and a notch, not shown.

An annular air outlet 42 is formed between the rear wall 22 and the end of the inner cylindrical wall 28 because the inner cylindrical wall 28 is shorter than the outer cylindrical wall 26. An oil outlet 44 is provided in the outer cylindrical wall 26. Seals are provided between the chamber 20 and the hollow shaft 12 one of which, as an example, is shown and indicated at numeral 46, whereby a pressure difference is maintained between the outside of the chamber 20 and the inside of the hollow shaft 12. An annular space 48 is formed between the inner cylindrical wall 28 of the chamber 20 and the hollow shaft 12 to communicate with the inside of the chamber 20 through the outlet 42 and the inside of the hollow shaft 12 through the apertures 50 in the wall of the hollow shaft 12 to maintain the pressure at the outlet 42 lower than the pressure at the inlet 18, thereby causing a flow of the mixture of air and oil mist entering the inlet 18, and a flow of air exiting from the outlet 42 to enter the inside of the hollow shaft 12. The air generally will not escape from the outlet 44 when passing through the packing 36 because the air flows towards the outlet 42 under the pressure difference between the inlet 18 and the outlet 42 while there is no pressure difference between the inlet 18 and the outlet 44. On the other hand, the mixture of the air and oil may enter the outlet 44 because of the pressure difference between the outlet 44 and the outlet 42. Nevertheless, a majority of the mixture of air and oil mist will be admitted to the chamber 20 through the inlet 18 but not the outlet 44 because the oil droplets formed in the passages of the packing 36 radially move toward the outlet 44 under centrifugal forces resulting in a blockage to the mixture of air and oil mist entering outlet 44.

A most satisfactorily permeable and substantially rigid matrix material to form the packing 36, is the product Retimet™ made by the Dunlop Company Ltd. Retimet™ includes a mesh of metal formed by plating a metal onto a synthetic open-celled formed structure and subsequently leaching out and/or otherwise removing the synthetic material. By substantially rigid it is meant that the matrix is capable of withstanding the centrifugal and other loads imposed on it during operation of the separator without suffering a significant amount of deformation which would tend to close the mesh and unduly restrict the flow of the mixture of air and oil therethrough. One particular advantage that stems from the use of Retimet™ is that it can be radially machined approximately to size and is sufficiently deformable to allow it to be sized by compressing prior to its insertion into the chamber 20.

The matrix material, nevertheless, could be formed of any suitable mesh material, for example, wire gauze or expanded mesh, a plurality of pierced plates, or alternatively a bristle structure. The essential feature of the matrix is that it should provide both axial and radial passages therethrough and a relatively large surface area of the passages for oil particles to collect on so that oil may migrate radially outwards and air radially inwards while the mixture of the air and oil mist travel axially through the matrix. It is suggested that a matrix having a higher delta pressure should be selected for use when the oil concentration in the mixture of air and oil mist to be separated, is higher.

In order to improve the efficiency of the separator 10, a plurality of radial bores 52 are drilled in the outer periphery of the packing 36 and circumferentially spaced apart from one another as shown in FIG. 2. The radial bores 52 are located axially close to the front wall 24 of the chamber 20. The distance between the center of each radial bore 52 and the outer surface of the front wall 24, as indicated by letter "D" in FIG. 3 is about two times the diameter of the radial bore 52 when the thickness of the front wall 24 measures between ½ and the total diameter of a radial bore 52.

In accordance with the deployment of radial bores 52, the outlet 44 is formed with a plurality of apertures 44a drilled in the outer cylindrical wall 26 of the chamber 20 and circumferentially spaced apart from one another. Each of the apertures 44a has a diameter equal to that of the radial bores 52 and aligns with the respective radial bores 52. The inlet 18 is accordingly formed with a plurality of apertures 18a, numbering equally to the radial bores 52, drilled in the front wall 24 and circumferentially spaced apart from one another. Each of the apertures 18a has a diameter which is equal to the distance from the outer surface of the outer cylindrical wall 26 to the bottom of the radial bore 52 as indicated at letter "d" in FIG. 3. It is suggested that the distance "d" is about 3 times of the diameter of a radial bore 52. The center line of each aperture 18a is radially spaced apart from the outer surface of the outer cylindrical wall 26 a distance of "S" which is equal to or slightly greater than the radius of the aperture 18a plus the thickness of the outer cylindrical wall 26 so that the apertures 18a are not blocked by the outer cylindrical wall 26. When the chamber 20 is assembled with the packing 36, the center line of the radial bores 52 is angled, as indicated by "A" as shown in FIG. 2, with a radium of the front wall 24 passing the center of the corresponding apertures 18a in the direction opposite to rotation "R" so that the radial bores 52 are substantially tangent to the inlet apertures 18a as shown in FIG. 2.

In operation, the mixture of air and oil mist enters the inlet apertures 18a under pressure and generally moves axially through the packing 36. The inlet apertures 18a are located at a distance from the axis of rotation of the separator 10, where the centrifugal force field acting on the oil mist is relatively strong. Therefore, the heavy oil droplets formed in the passages of the packing 36 are thrown radially to the outer periphery of packing 36. The mixture of air and oil mist when just entering the packing 36 through the inlet apertures 18a is oil rich and a major proportion of oil droplets are formed in the passage in the packing 36. The major proportion of the oil droplets rotate together with, but slower than the packing 36 because of their inertia. Thus, the movement of the oil droplets is offset from the axial direction and the droplets are collected in the radial bores 52 which are circumferentially behind the respective inlet apertures 18a relative to the direction of the rotation. The oil droplets collected in the radial bores 52 are rapidly thrown out of the rotating chamber 20 through the outlet apertures 44a by centrifugal forces. After the major proportion of the oil droplets are ejected from the radial bores 52, the mixture of air and oil mist in the passages in the packing 36 downstream of the radial bores 52 is relatively oil lean. Therefore, the remainder of the oil mist in the mixture forms a relatively smaller quantity of oil droplets in the passages of the packing 36 downstream of the radial bores 52 so that the passages in the packing 36 downstream of the radial bores 52 are relatively cleared to facilitate a continuous movement of following portion of the mixture of the air and oil mist.

The oil droplets formed from the remainder of the oil mist in the passages in the packing 36 downstream of the radial bores 52 are driven by the centrifugal forces to move radially and outwardly towards the outer cylindrical wall 26 of the chamber 20, and eventually move along the outer cylindrical wall 26 and exit from the outlet apertures 44a. Air relatively free from oil mist then leaves the separator 10 through the air outlet 42 and the annular space 48 to enter the apertures 50 in the wall of the hollow shaft 12, and is carried to a point of use by the hollow shaft 12.

An air/oil separator 10a according to another preferred embodiment of the invention as shown in FIG. 4 generally has a structure similar to the air/oil separator 10 shown in FIGS. 1–3 and the parts similar to those equivalents in FIG. 3 are indicated by the same numerals and will not be redundantly described.

The cut-away area of the packing 36 of the air/oil separator 10a, being different from the plurality of radial bores 52 of the air/oil separator 10 shown in FIG. 1, is formed by an annular groove 52a radially extending from the outer periphery of the packing 36 to simplify the machining of the packing 36. The depth and axial position of the annular groove 52a are similar to those of the radial bores 52 of the air/oil separator 10, whereby the annular groove 52a will simulate the same advantage as the radial bores 52 of the air/oil separator 10 at a lower manufacturing cost. This structure also makes assembly of the air/oil separator 10a easier. Unlike the angular relationship indicated by "A" in FIG. 1, between the radial bores 52 and the inlet apertures 18a, there is no such relationship required between the inlet apertures 18a and the annular groove 52a because the annular groove 52a is circumferentially continuous. The number of outlet apertures 44b can be determined without matching the number of the radial bores 52. In this particular embodiment, five outlet apertures 44b are provided, equally and circumferentially spaced apart from one another (not shown). The diameter of each of the outlet apertures 44b is about ½ of the width of the annular groove 52a.

The outer cylindrical wall 26 of the chamber 20 in this embodiment, being different again from that of the air/oil separator 10, is formed with an upstream section 26a having a relatively larger diameter and a downstream section 26b having a relatively smaller diameter. The mixture of air and oil mist under the pressure difference moves axially and radially, inwardly from the inlet apertures 18a towards the annular outlet 42 so that the air with the remainder of the oil mist to be separated moving in the passages in the downstream section of the packing 36 is generally in an inner radial portion of the packing 36. Therefore the diameter reduced downstream section 26b of the packing 36 will not substantially affect the efficiency of the separation of while the weight of the separator is thereby reduced. In addition the stepped outer cylindrical wall configuration facilitates the oil droplets formed in the passages downstream of the annular groove 52a to flow back along the outer cylindrical wall 26 towards the outlet apertures 44b.

Modifications and improvements to the above described embodiments of the present invention may become apparent to those skilled in the art. The foregoing description is intended to be exemplary rather than limiting. The scope of the invention is therefore intended to be limited solely by the scope of the appended claims.

What is claimed is:

1. An apparatus adapted for separating a liquid suspended in a gas, comprising:
   a) a rotatable vessel defining a chamber having an inlet at a first end of the chamber for admitting the gas having the liquid suspended therein, an outlet for liquid in a radially outer part of the chamber and an outlet for gas in a radially inner part of the chamber at a second end thereof;
   b) a packing within the chamber adapted to rotate with the vessel defining the chamber, the packing having a substantially rigid matrix adapted to inhibit collapse under centrifugal forces during rotation of the chamber, the matrix including interstices defining a plurality of flow passages permeable to the liquid and gas for both axial and radial movement of the liquid and gas therethrough; and
   c) a cut-away area formed in the packing to facilitate ejection from the packing of liquid droplets formed in the passages of the packing, whereby the passages are relatively cleared to facilitate a continuous movement of a following portion of the mixture of liquid and gas therethrough.

2. An apparatus as claimed in claim 1 wherein the cut-away area extends inwardly and radially from an outer periphery of the packing.

3. An apparatus as claimed in claim 1 wherein the cut-away area is axially located close to the first end of the chamber.

4. An apparatus as claimed in claim 1 wherein the cut-away area axially aligns with the liquid outlet of the chamber.

5. An apparatus as claimed in claim 1 wherein the cut-away area comprises a plurality of bores circumferentially spaced apart from one another, extending radially from an outer periphery of the packing.

6. An apparatus as claimed in claim 1 wherein the cut-away area comprises an annular groove extending radially from an outer periphery of the packing.

7. An apparatus as claimed in claim 1 wherein the rotatable chamber is adapted to be mounted on a hollow shaft and to be driven to rotate, whereby the gas outlet in the radially inner part of the chamber communicates with an interior of the hollow shaft through at least one aperture in a wall of the hollow shaft.

8. An apparatus as claimed in claim 1 wherein the liquid outlet in the radially outer part of the chamber comprises a plurality of apertures in a cylindrical outer wall of the chamber and circumferentially spaced apart from one another.

9. An apparatus as claimed in claim 1 wherein the inlet comprises a plurality of apertures in an end wall of the chamber and circumferentially spaced apart from one another.

10. An apparatus as claimed in claim 1 wherein the apertures of the inlet are radially located close to an outer cylindrical wall.

11. An apparatus adapted for separating a liquid suspended in a gas comprising:
   a) a cylindrical vessel having a first outer cylindrical wall and an end wall defining a chamber having a plurality of apertures in the end wall and close to the first outer cylindrical wall for admitting the gas having the liquid suspended therein, a plurality of apertures in the first outer cylindrical wall close to the first end wall for expelling the liquid, the vessel being adapted to be mounted on a hollow shaft and to rotate therewith, an interior of the chamber communicating with an interior of the hollow shaft through at least one aperture in a wall of the hollow shaft for expelling the gas into the hollow shaft;
   b) a packing within the chamber adapted for rotation with the vessel, the packing having a substantially rigid matrix adapted to inhibit collapse under centrifugal forces during rotation of the chamber, the matrix including interstices defining a plurality of flow passages permeable to the liquid and gas for both axial and radial movement of the liquid and gas therethrough; and
   c) a cut-away area formed in the packing located axially close to but spaced apart from an end of the packing, radially extending from an outer periphery of the packing and axially aligning with the apertures in the cylindrical wall of the chamber to facilitate ejection from the packing of liquid droplets formed in the passages under centrifugal forces, whereby the passages are cleared to facilitate a continuous movement of a following portion of the mixture of liquid and gas.

12. An air/oil separating arrangement for a machine having a rotatable hollow shaft, comprising:
   a) a vessel defining a separating chamber mounted to and adapted to rotate together with the hollow shaft, the vessel having an inlet at a first end of the chamber for admitting a mixture of air and oil mist under a pressure differential between outside of the chamber and inside of the hollow shaft, an outlet in the vessel at a radial inner part of the chamber in communication with the inside of the hollow shaft for expelling the air into the hollow shaft under the pressure differential, and an outlet in the vessel at a radial outer part of the chamber for expelling oil droplets out of the chamber under centrifugal forces during rotation of the chamber;
   b) a packing within the chamber adapted for rotation with the chamber, the packing having a substantially rigid matrix adapted to inhibit collapse under the centrifugal forces, the matrix including interstices defining a plurality of flow passages permeable to the air and oil for both axial and radial movement of the air and oil therethrough;

c) a cut-away area formed in the packing radially extending from an outer periphery of the packing to facilitate ejection from the packing of oil droplets formed in the passages of the packing, whereby the passages are relatively cleared to facilitate a continuous movement of a following portion of the mixture of air and oil mist therethrough.

13. An air/oil separating arrangement as claimed in claim 1 wherein the cut-away area is axially located close to but spaced apart from an end of the packing adjacent to the inlet of the chamber.

14. An air/oil separating arrangement as claimed in claim 1 wherein the oil outlet is axially located close to the first end of the chamber and axially aligns with the cut-away area of the packing.

15. An air/oil separating arrangement as claimed in claim 1 wherein the air outlet is axially located close to a second end of the chamber.

16. An air/oil separating arrangement as claimed in claim 1 wherein the vessel defining the chamber is sealingly mounted to the hollow shaft, and an annular space is formed between the radially inner part of the chamber and the hollow shaft communicates with the inside of the hollow shaft through at least one aperture extending through a wall of the hollow shaft so that a pressure at the air outlet of the chamber is maintained lower than the pressure at the inlet and the oil outlet of the chamber.

17. An air/oil separating arrangement as claimed in claim 1 wherein the inlet comprises a plurality of apertures in the vessel at the first end of the chamber, circumferentially spaced apart from one another and close to an outer cylindrical wall of the vessel.

18. An air/oil separating arrangement as claimed in claim 1 wherein the cut-away area radially extends from an outer periphery of the packing a depth substantially equal to a diameter of the inlet apertures.

* * * * *